United States Patent [19]

Kimura et al.

[11] Patent Number: 5,053,252

[45] Date of Patent: Oct. 1, 1991

[54] METHOD AND APPARATUS FOR MANUFACTURING OPTICAL MEMORY DEVICES

[75] Inventors: Kazuhiro Kimura, Nishinomiya; Hiroyuki Katayama, Nara; Junichiro Nakayama, Nara; Kenji Ohta, Nara; Hiroyuki Ikenaga, Nara, all of Japan

[73] Assignee: Sharp Kabushiki Kaisha, Osaka, Japan

[21] Appl. No.: 384,257

[22] Filed: Jul. 21, 1989

[30] Foreign Application Priority Data

Aug. 3, 1988 [JP] Japan .............................. 63-194160

[51] Int. Cl.⁵ .................. B05D 3/02; B05D 3/12; B05D 5/06; C23C 16/54
[52] U.S. Cl. ................................ 427/164; 427/275; 427/276; 427/278; 427/296; 118/44; 118/718; 118/725; 204/298.24; 204/298.26
[58] Field of Search ............... 427/164, 275, 278, 276, 427/296; 118/44, 722, 718, 725; 264/284; 204/298.24, 298.26

[56] References Cited

U.S. PATENT DOCUMENTS

| 4,209,804 | 6/1980 | Dil .................................. 369/105 X |
| 4,544,835 | 10/1985 | Drexler ............................ 235/487 |
| 4,680,460 | 7/1987 | Drexler ............................ 235/488 |
| 4,892,385 | 1/1990 | Webster, Jr. et al. .............. 427/7 X |

FOREIGN PATENT DOCUMENTS 603110 6/1948 United Kingdom .

Primary Examiner—Evan Lawrence
Attorney, Agent, or Firm—Cohen, Pontani & Lieberman

[57] ABSTRACT

A method and apparatus for manufacturing an optical memory device. The method comprises the steps of forming a secondary medium layer on a substrate and forming on the substrate guide track grooves for guiding a light beam, both steps being carried out in a single vacuum chamber. The step of forming the guide track grooves comprises heating the substrate to soften the same and pressurizing the substrate by a pressure roller having transcribed patterns corresponding to the guide track grooves on its cylindrical surface.

11 Claims, 2 Drawing Sheets

METHOD AND APPARATUS FOR MANUFACTURING OPTICAL MEMORY DEVICES

BACKGROUND OF THE INVENTION

1. Field of the Invention

The present invention relates to a method of manufacturing an optical memory device such as an optical card or an optical disc used as a large capacity data recording medium, and to an apparatus for the same.

2. Description of the Prior Art

An optical memory device comprises a substrate, a recording layer formed on this substrate, and a protective layer formed on this recording layer for protecting the same (see U.S. Pat. No. 4,544,835 and U.S. Pat. No. 4,680,460).

A method heretofore known of forming guide tracks used for writing and reading information to and from a sheet-like substrate to manufacture an optical memory device such as an optical card or an optical disc includes a process for continuously printing light and shade patterns for tracking on a sheet roll-like substrate material. In addition, a method heretofore known of forming groove-shaped guide tracks used for tracking utilizing diffraction of light includes a process for transcribing the shape of grooves onto a cut sheet-like or rolled sheet-like substrate material by means such as a 2P process (photopolymer process), a process for stamping the shape of grooves by directly pressurizing a substrate using a heated stamper, and a process for transcribing the shape of grooves from a stamper by injection molding.

However, the above described printing method has the disadvantage in that there is a limit to storage capacity because a pattern having a constant line width or less can not be printed. In addition, the other methods for forming groove-shaped guide tracks have the disadvantage in that it takes a lot of time to manufacture an optical memory device because continuous processing can not be performed, causing difficulty in reducing cost.

Furthermore, a sheet-like substrate material is generally wound like the roll, so that a substrate is slightly warped. Such warping of the substrate is not preferable in optical characteristics and causes difficulty in the manufacturing of an optical memory device with high precision. Therefore, under the present circumstances and in accordance with the invention, warping is eliminated by heat treatment.

SUMMARY OF THE INVENTION

The present invention provides a method of manufacturing an optical memory device, which comprises the steps of forming a recording medium layer on a substrate, forming on the substrate guide track grooves for guiding a light beam, cutting the substrate to a predetermined size, and forming a coating layer for protecting the recording medium layer, the step of forming the guide track grooves comprising heating the substrate to soften the same and pressurizing the substrate by a pressure roller having transcribed patterns corresponding to the guide track grooves on its cylindrical surface, and to an apparatus for the same.

According to the present invention, a substrate is heated to be softened and pressurized by a pressure roller having transcribed patterns corresponding to guide track grooves on its cylindrical surface, so that miniaturized guide track grooves can be continuously formed on the substrate. In addition, warping of the substrate is eliminated by softening of the substrate. Accordingly, the time required to manufacture an optical memory device can be shortened and, consequently, a cost reduction can be achieved.

DESCRIPTION OF THE PREFERRED EMBODIMENTS

Figure 1:
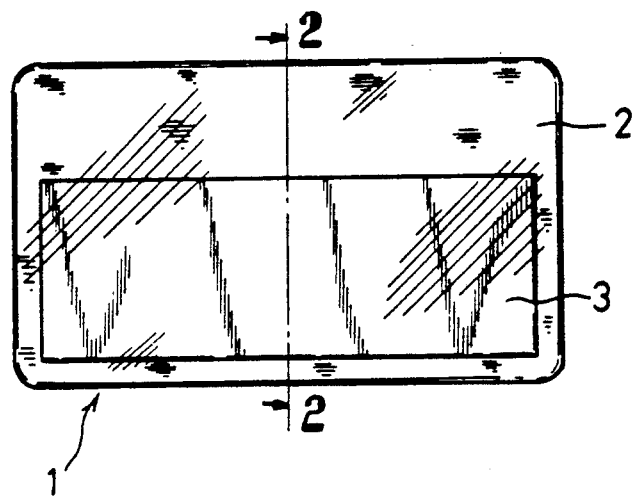
FIG. 1 is a plan view showing one example of an optical memory device manufactured using a manufacturing method or apparatus according to the present invention.

A method of manufacturing an optical memory device according to the present invention comprises the steps of forming a recording medium layer on a substrate, forming on the substrate guide track grooves for guiding a light beam, cutting the substrate to a predetermined size, and forming a coating layer for protecting the recording medium layer, the step of forming the guide track grooves comprising heating the substrate to soften the same and pressurizing the substrate by a pressure roller having transcribed patterns corresponding to the guide track grooves on its cylindrical surface.

A film made of resins having light permeability, such as a film made of polycarbonate resins approximately 0.2 to 1.0 mm thick, is mainly used as the above described substrate. In addition, the substrate is preferably removably wound around a roll.

The above described recording medium layer is formed using a sputtering process, a vacuum evaporation process, or a spray process or the like which is known in the art. An RE-TM magnetic thin film with perpendicular magnetization containing TbFeCo, GdTbFe, NdDyFeCo, TbFe or GdTbFeCo, a garnet magnetic thin film containing Co substitution garnet and Bi substitution rare earth-iron garnet, or a polycrystal perpendicular magnetic thin film containing PtMnSb and MnBi is used as the recording medium layer formed by the sputtering process and the vacuum evaporation process. On the other hand, the recording medium layer formed by the spray process is made of photochromic materials, or organic dyestuff materials or the like.

In the step of forming the above described guide track grooves, the substrate may be previously heated to a temperature of its softening point or more by a heater and, then, pressurized by the pressure roller having transcribed patterns on its cylindrical surface, or the pressure roller may be heated to a temperature of the softening point of the substrate or more by, for example, a heater provided in the pressure roller to simultaneously heat and pressurize the substrate with the heated pressure roller.

Formation of the recording medium layer by the sputtering process or the vacuum evaporation process is achieved in a vacuum chamber because it requires a predetermined atmosphere. Thus, at least the step of forming the recording medium layer and the step of forming the guide track grooves out of the above described steps are preferably carried out in a single vacuum chamber. Accordingly, it is easy to continuously carry out both these steps and the possibility of adhesion of dust or the like to the substrate during both of these steps is eliminated, although it does not matter which step is carried out first.

Furthermore, although the step of cutting the substrate and the step of forming the coating layer can be carried out using a method heretofore known, the order of these steps may be reversed. In addition, acrylate resins, for example, can be used as materials of the coating layer but is mentioned not by way of limitation. The coating layer may be formed on one or both surfaces or over the whole of the optical memory device.

Figure 2:
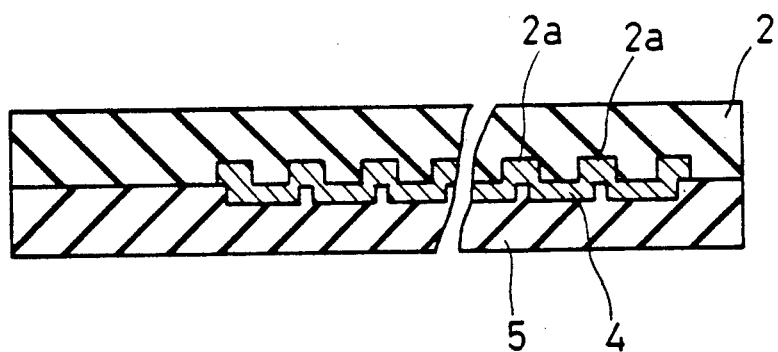
FIG. 2 is a cross-sectional view taken along the line A—A in FIG. 1.

An example of an optical memory device manufactured by the manufacturing method or apparatus according to the present invention will now be described with reference to FIGS. 1 and 2.

An optical card 1 serving as an optical memory device comprises an optical recording region 3 for performing optical recording on a substrate 2. The substrate 2 is formed of a transparent material, the thickness thereof being not specifically but suitably approximately 0.2 to 1.0 mm. The optical recording region 3 has guide track grooves 2a for guiding a light beam, and a recording medium layer 4 is formed thereon. In addition, the recording medium layer 4 is protected by a coating layer 5 from the external air and mechanical impact.

Figure 3:
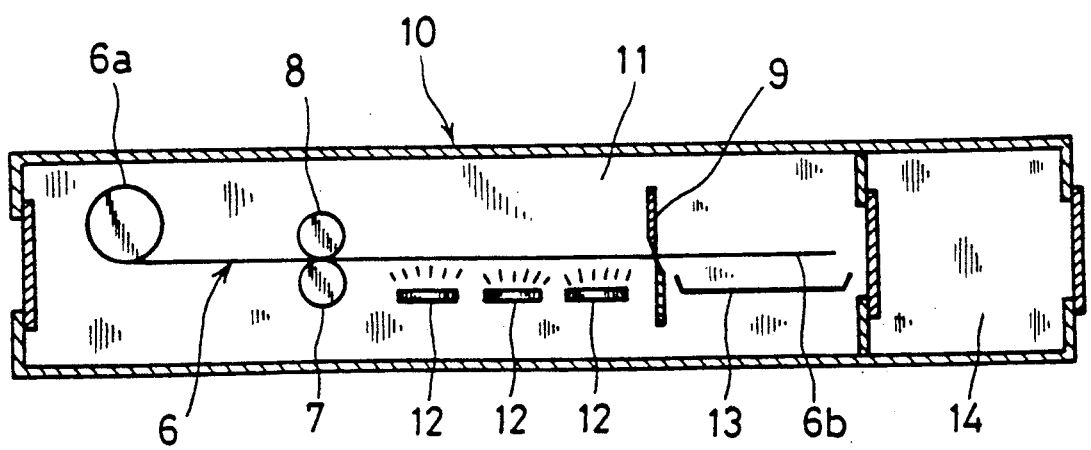
FIG. 3 is a diagram showing a first embodiment of a manufacturing apparatus according to the present invention.

FIG. 3 is a diagram showing a first embodiment of the manufacturing apparatus according to the present invention, which is adapted such that a rolled sheet-like substrate 6, a pressure roller 7 serving as a guide track forming station, an opposed roller 8 and a cutter 9 are arranged within a vacuum compartment 11 in a vacuum chamber 10. The sheet-like substrate 6 made of polycarbonate which is a material of the substrate 2 in the optical card 1 is accommodated in the vacuum compartment 11 in the vacuum chamber 10, the substrate 6 being wound around a sheet roll portion 6a.

The pressure roller 7 having on its cylindrical surface the transcribed patterns corresponding to the guide track grooves (see FIG. 2) to be stamped on the substrate 6 is rotatably arranged on the downstream side of the sheet roll portion 6a of the substrate 6. The above described transcribed patterns may be directly stamped on the cylindrical surface of the pressure roller 7, or a template having transcribed patterns stamped thereon may be wound around the cylindrical surface of the pressure roller 7.

A not-shown heater is provided in the pressure roller 7. This heater is adapted to heat the pressure roller 7 to allow the sheet-like substrate 6 unwound from the sheet roll portion 6a to be heated to a temperature of its softening point or more through this pressure roller 7. When the substrate 6 is polycarbonate whose softening point is approximately 160° C., the heater heats the substrate 6 to a temperature of approximately 160° to 200° C. through the pressure roller 7. Meanwhile, the opposed roller 8 for supporting the load from the pressure roller 7 is rotatably arranged in opposition to the pressure roller 7.

Furthermore, targets 12 of a sputtering device for adhering a recording medium layer by sputtering are arranged below the substrate 6 between the pressure roller 7 and the cutter 9. In addition, a pan 13 for catching a cut piece 6b cut by the cutter 9 is located below the substrate 6 on the downstream side of the cutter 9. A punching station for cutting the optical card 1 of a predetermined size from the substrate 6 by punching and a coating layer forming station for forming a coating layer for protecting the above described optical recording region 3 or the like on the optical card 1 cut by punching, which are not shown, are provided outside of the vacuum chamber 10.

In manufacturing the optical card 1, the sheet-like substrate 6 unwound from the sheet roll portion 6a is passed between the pressure roller 7 and the opposed roller 8 which are heated to a temperature of the softening point of the substrate 6 or more. Accordingly, patterns of the pressure roller 7 are transcribed onto the substrate 6, so that guide track grooves are formed. Subsequently, a recording medium layer is formed on the substrate 6 having the guide track grooves formed thereon by a sputtering process. The recording medium layer constitutes the optical recording region 3 in the optical card 1 after completion.

Thereafter, the substrate 6 is cut to a cut piece 6b having a predetermined length by the cutter 9. The cut piece 6b is taken out of the vacuum chamber 10 through a spare compartment 14 for maintaining a vacuum state in the vacuum compartment 11. The optical card 1 of a predetermined size is cut from the cut piece 6b by punching using a not-shown punching station. Moreover, on the optical card 1, a coating layer for protecting the surface thereof is formed by a not-shown coating layer forming station. Meanwhile, if the vacuum compartment 11 in the vacuum chamber 10 is caused to have a considerable volume, the above described punching step can be incorporated in the vacuum chamber 10. Accordingly, the cut piece 6b can be taken out of the vacuum chamber 10 after cutting the optical card 1 of a predetermined size from the cut piece 6b by punching.

Description is now made of a second embodiment of the apparatus for manufacturing an optical memory device according to the present invention.

Figure 4:
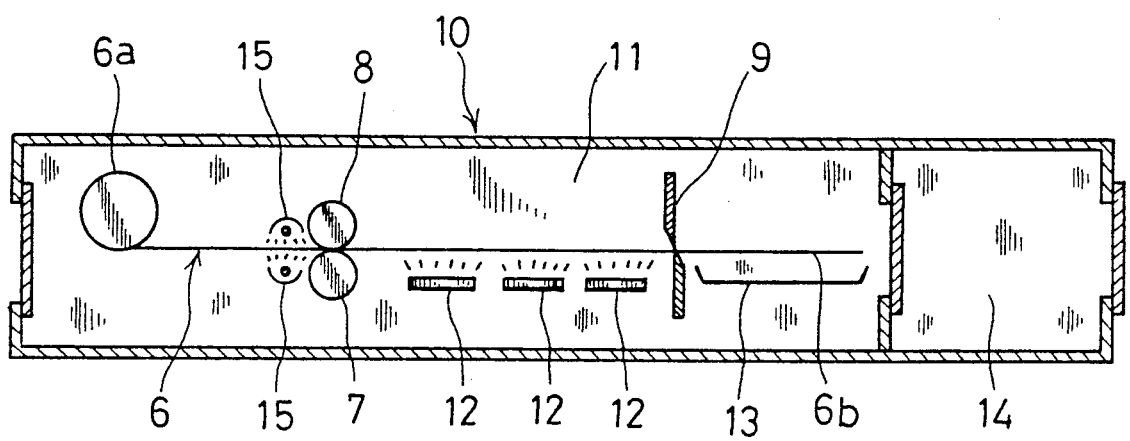
FIG. 4 is a diagram showing a second embodiment of a manufacturing apparatus according to the present invention.

As shown in FIG. 4, the second embodiment is modification of the first embodiment, and is adapted such that a pressure roller 7, an opposed roller 8, a cutter 9 and the like are accommodated in a vacuum chamber 10, and heaters 15 are arranged not in the presure roller 7 but on the upstream side of the pressure roller 7 and the opposed roller 8 to heat the sheet-like substrate 6 to a temperature of its softening point or more. A manufacturing method according to this second embodiment is almost the same as that according to the first embodiment and, hence, a detailed description thereof is not repeated.

In this second embodiment, the substrate is directly heated to a temperature of its softening point or more, instead of heating the pressure roller, so that the substrate can be uniformly heated. As a result, the manufacturing method according to this second embodiment can prevent a decrease in the degree of flatness of the substrate due to variations in thickness, rim waves, wave edge, center buckle, or center waves or the like which are liable to occur on the substrate due to variations in temperature of the surface of the pressure roller when the substrate on the side of the pressure roller is heated, similarly to the manufacturing method according to the first embodiment.

Figure 5:
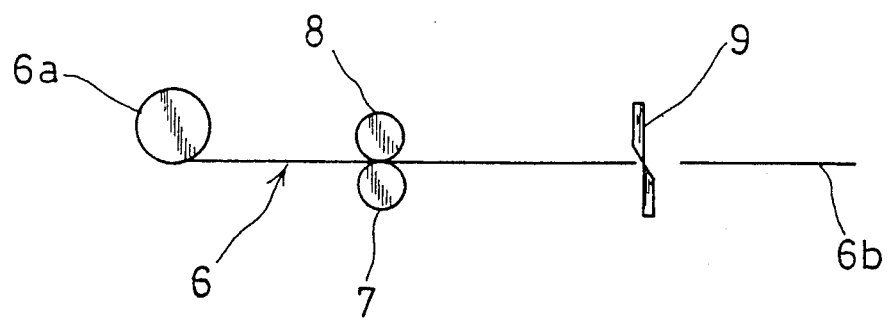
FIG. 5 is a diagram showing a third embodiment of a manufacturing apparatus according to the present invention.
Figure 6:
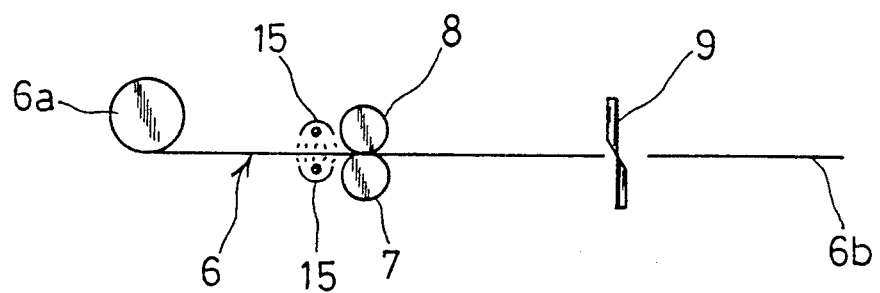
FIG. 6 is a diagram showing a fourth embodiment of a manufacturing apparatus according to the present invention.

FIGS. 5 and 6 are diagrams respectively showing third and fourth embodiments of the manufacturing apparatus according to the present invention.

The third and fourth embodiments are the same as the embodiments shown in FIGS. 3 and 4 except that the vacuum chamber 10 has been removed. It should be apparent that a vacuum chamber is locally used in a recording medium layer forming station, which is not shown, where a sputtering process or a vacuum evaporation process is used to form the recording medium layer.

As described in the text, according to the present invention, guide tracks are continuously formed and warping of a substrate can be eliminated at the time of forming of the guide tracks, so that an optical memory device of constant quality is efficiently manufactured.

What is claimed is:

1. A method of manufacturing an optical memory device, said method comprising the steps of continuously forming a recording medium layer on a longitudinally running tape-like substrate, and continuously forming on the running substrate guide track grooves for guiding a light beam, said step of forming the guide track grooves comprising heating the substrate to soften the same and pressurizing the substrate using a pressure roller having transcribed patterns corresponding to the guide track grooves on its cylindrical surface, and said steps of forming the guide track grooves and of forming the recording medium layer being carried out in single vacuum chamber.

2. The manufacturing method according to claim 1, wherein the step of forming the guide track grooves is carried out by a heater for previously heating the substrate and a pressure roller comprising transcribed patterns corresponding to the guide track grooves.

3. The manufacturing method according to claim 1, wherein the step of forming the guide track grooves is carried out by a pressure roller comprising a heater and transcribed patterns corresponding to the guide track grooves.

4. The manufacturing method according to claim 1, wherein the step of forming the recording medium layer is carried out after the step of forming the guide track grooves.

5. The manufacturing method according to claim 1, wherein the step of forming the guide track grooves is carried out after the step of forming the recording medium layer.

6. An apparatus for manufacturing an optical memory device, said apparatus comprising guide track groove forming means for forming guide track grooves on a substrate by heating the substrate to soften the same and pressurizing the substrate using a pressure roller having transcribed patterns corresponding to the guide track grooves on its cylindrical surface, recording medium layer forming means for forming a recording medium layer on the substrate, and a single vacuum chamber for housing the guide track groove forming means and the recording medium layer forming means.

7. A method of manufacturing an optical memory device, said method comprising the steps of forming a recording medium layer on a substrate, and forming on the substrate guide track grooves for guiding a light beam, said step of forming the guide track grooves comprising heating the substrate to soften the same and pressurizing the substrate using a pressure roller having transcribed patterns corresponding to the guide track grooves on its cylindrical surface, and said steps of forming the guide track grooves and of forming the recording medium layer being carried out in a single vacuum chamber.

8. The manufacturing method according to claim 7, wherein said step of forming the guide track grooves further comprises heating the substrate using a heater prior to pressurizing the substrate using a pressure roller having transcribed patterns corresponding to the guide track grooves.

9. The manufacturing method according to claim 7, wherein said step of forming the guide track grooves is carried out using a pressure roller comprising a heater and transcribed patterns corresponding to the guide track grooves.

10. The manufacturing method according to claim 7, wherein said step of forming the recording medium layer is carried out after said step of forming the guide track grooves.

11. The manufacturing method according to claim 7, wherein said step of forming the guide track grooves is carried out after the step of forming the recording medium layer.

* * * * *